United States Patent
Tielemans et al.

(10) Patent No.: US 10,590,304 B2
(45) Date of Patent: Mar. 17, 2020

(54) RADIATION CURABLE AQUEOUS DISPERSIONS

(75) Inventors: Michel Tielemans, Wemmel (BE);
Steven Cappelle, Ninove (BE);
Stephan Peeters, Heverlee (BE);
Lieven Depuydt, Grimbergen (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 437 days.

(21) Appl. No.: 14/118,965

(22) PCT Filed: Jul. 5, 2012

(86) PCT No.: PCT/EP2012/063141
§ 371 (c)(1),
(2), (4) Date: Nov. 20, 2013

(87) PCT Pub. No.: WO2013/007598
PCT Pub. Date: Jan. 17, 2013

(65) Prior Publication Data
US 2014/0099449 A1    Apr. 10, 2014

(30) Foreign Application Priority Data
Jul. 14, 2011  (EP) .................... 11173914

(51) Int. Cl.
*C09D 175/16* (2006.01)
*C08L 33/14* (2006.01)
*C08G 18/12* (2006.01)
*C08G 18/75* (2006.01)
*C08G 18/08* (2006.01)
*C08G 18/42* (2006.01)
*C08G 18/67* (2006.01)
*C08G 18/34* (2006.01)

(52) U.S. Cl.
CPC ....... *C09D 175/16* (2013.01); *C08G 18/0823* (2013.01); *C08G 18/12* (2013.01); *C08G 18/348* (2013.01); *C08G 18/4211* (2013.01); *C08G 18/4238* (2013.01); *C08G 18/672* (2013.01); *C08G 18/758* (2013.01); *C08L 33/14* (2013.01)

(58) Field of Classification Search
CPC ....... C08L 33/14; C08L 75/04; C08G 18/672; C08G 18/758; C08G 18/0823; C08G 18/12; C08G 18/348; C08G 18/4211; C08G 18/4238; C08G 18/6659; C08G 18/3876; C09D 175/16
USPC ...................................... 427/508
See application file for complete search history.

(56) References Cited

U.S. PATENT DOCUMENTS

| 4,120,721 A | 10/1978 | Ketley et al. |
| 4,952,711 A | 8/1990 | Jacobine et al. |
| 5,840,823 A | 11/1998 | Licht et al. |
| 2007/0021554 A1* | 1/2007 | Urban ................ C08G 18/0823 524/591 |
| 2009/0270581 A1 | 10/2009 | Tielemans et al. |
| 2013/0122310 A1 | 5/2013 | Tielemans et al. |

FOREIGN PATENT DOCUMENTS

| EP | 0 794 204 | 9/1997 |
| EP | 2 412 739 | 2/2012 |
| WO | WO 2007118781 A1 * | 10/2007 ......... C08G 18/0823 |
| WO | 2009/025902 | 2/2009 |
| WO | 2010/126618 | 11/2010 |

OTHER PUBLICATIONS

Yang et al. "Newly UV-curable polyurethane coatings prepared by multifunctional thiol- and ene-terminated polyurethane aqueous dispersions mixtures: Preparation and characterization" Polymer vol. 50, Issue 7, 2009 pp. 1717-1722.*
Wikipedia entry for Suspension (chemistry) accessed on Oct. 21, 2016.*
Wikipedia entry for Dispersion (chemistry) accessed on Oct. 21, 2016.*
International Search Report dated Sep. 13, 2012 in International (PCT) Application No. PCT/EP2012/063141.

* cited by examiner

Primary Examiner — Robert S Walters, Jr.
(74) Attorney, Agent, or Firm — Wenderoth, Lind & Ponack, L.L.P.

(57) ABSTRACT

An aqueous dispersion comprising a mixture of a first dispersion and a second dispersion, wherein the first dispersion comprises at least one (meth)acrylated pre-polymer (A), and the second dispersion comprises at least one thiol-functional compound (B). The aqueous dispersion optionally comprises at least one ethylenically unsaturated compound (C).

12 Claims, No Drawings

RADIATION CURABLE AQUEOUS DISPERSIONS

TECHNICAL FIELD OF THE INVENTION

The present invention relates to the field of long wavelength radiation curable aqueous dispersions and to methods to obtain the same.

BACKGROUND OF THE INVENTION

Radiation curable polymer dispersions and in particular polyurethane dispersions are known since long to provide coatings for different substrates such as wood, plastics and metal which show a good mechanical and chemical resistance as well as some flexibility.

Ethylenically unsaturated polyurethanes have been made from the end capping of an isocyanate terminated polyurethane pre-polymer with an ethylenically unsaturated, especially (meth)acrylated monomer. Ethylenically unsaturated polyurethanes can also be made from the chain extension of isocyanate terminated ethylenically unsaturated polyurethane pre-polymers with polyamines.

A drawback of known (meth)acryloyl functional dispersions is their limitation to provide good surface cure when irradiated with long wavelength (300 nm or higher) UV light sources such as UV-LED (light emitting diode) or UV-A lamps.

Current UV formulations curable with long wavelength UV light sources are sensitive to oxygen inhibition resulting in a reduced surface cure reactivity which makes them poorly suited for applications where high speed or low energy curing is required.

The phenomena of oxygen inhibition can be mediated by applying a nitrogen blanket, in situ oxygen barriers such as paraffin wax, oxygen scavengers or the use of higher intensity lamps. A drawback of these existing attempts to solve this problem is that each of these techniques offers limited protection against said oxygen inhibition and increases the coating cost. Furthermore, they are limited to industrial applications and are very difficult to adapt to field applied applications such as domestic and small to medium sized workshop applications.

We have now found dispersions which overcome these problems, at least in part.

EP 0 794 204 discloses aqueous polyurethane dispersions having latent crosslinking properties and based on a mixture of 2 different disperse phases. The dispersions used as coatings and in particular as adhesives are cured by drying. No radiation curable compositions are disclosed in said document.

SUMMARY OF THE INVENTION

An object of the present invention is to provide aqueous polymer dispersions, and in particular radiation curable aqueous polymer dispersions, that have good stability. Another object of the invention is to provide aqueous polymer dispersions, and in particular radiation curable aqueous polymer dispersions, that allow low irradiative energy curing.

The aqueous dispersions of the present invention present one or more of the following advantages:
- a particularly stable aqueous dispersion is provided which has a low sensitivity to oxygen inhibition.
- they can be cured at a low cost because a nitrogen blanket, an in situ oxygen barrier or high intensity radiations are not needed.
- they allow a high line speed and/or low irradiative energy curing.
- they show a high polymerization rate upon curing with UV-light with a wavelength higher than 300 nm.
- they can be cured with low energy light sources such as for instance UV-A lamps and/or UV LEDs. UV LEDS have the advantage of a long lifetime and can be instantly turned on and off without much latency. They also do not emit IR light, i.e. heat.
- they can be cured without much heating of the coating and without much need for a cooling of said coating.
- they can be cured with a low energy consumption.
- they can be cured without exposing the manipulator to much danger as they do not involve the use of mercury lamps, the production of ozone or the use of dangerous UV-B or UV-C.
- they allow to have a low volatile content, a high solids content, a low viscosity, and/or a low film formation temperature.
- coatings with very good surface cure, scratch resistance, solvent resistance and appearance can be obtained.

In a first aspect, the present invention relates to an aqueous dispersion, more in particular a radiation curable aqueous dispersion. This aqueous dispersion comprises a mixture of a first dispersion and a second dispersion, the first and second dispersions typically being aqueous dispersions. The aqueous dispersion of the invention may optionally comprise other components.

The first dispersion comprises at least one (meth)acrylated pre-polymer (A), and
the second dispersion comprises at least one compound (B) selected from thiol-functional compounds and/or from amino-functional compounds. Thiol-functional compounds (B) are preferred, and in particular those comprising at least two thiol groups.

As used herein and unless provided otherwise, the term "aqueous" refers to a liquid medium comprising at least 50% wt of water. This means that in the case of an "aqueous dispersion", which comprises a solid part dispersed in a liquid medium, the liquid medium comprises at least 50% wt of water. Preferably, "aqueous" refers to a liquid medium comprising at least 90% wt of water. More preferably, "aqueous" refers to a liquid medium comprising at least 99% wt of water and most preferably, "aqueous" refers to a liquid medium consisting essentially of water.

As used herein and unless provided otherwise, the term "urethane" relates to both urethanes and polyurethanes, often referred to by the term (poly)urethane. Polyurethanes are preferred. By a polyurethane is meant to designate a compound comprising a plurality (n) of polyisocyanate monomer units in the backbone, with n typically at least 2, more typically at least 3.

As used herein and unless provided otherwise, the term "pre-polymer" refers to a compound, preferably a polymer, comprising polymerisable functional groups. A purpose of at least some of these functional groups is typically to permit the reaction of the "pre-polymer" with at least one second component upon curing to form a solid material. For instance, the term "(meth)acrylated pre-polymer" refers to a compound, preferably a polymeric compound, comprising one or more (meth)acryloyl groups, preferably at least two (meth)acryloyl groups.

In the present invention, the term "(meth)acryloyl" is to be understood as to encompass both acryloyl and methacryloyl compounds, derivatives thereof as well as mixtures thereof.

In an embodiment, the aqueous dispersion of the invention may further comprise at least one ethylenically unsaturated compound (C). Said ethylenically unsaturated compound (C) is typically contained (e.g. added to or dispersed) in the first dispersion comprising the (meth)acrylated pre-polymer(s) (A) before that said dispersion comprising the (meth)acrylated pre-polymer(s) (A) is mixed with the second dispersion comprising the compounds (B), which preferably are thiol-functional compounds. The polymerisable ethylenically unsaturated groups of compound (C) are generally chosen from (meth)acrylic and allylic groups, preferably are (meth)acrylic groups, most preferably are acrylic groups.

It was found that an aqueous dispersion comprising a first and a second dispersion as mentioned above exhibits a good surface cure even when irradiated with long wavelength UV light sources such as UV LED or UV-A lamps, thereby allowing higher line speed and/or less irradiative energy curing. These formulations exhibited also good solution stability.

In an embodiment of the first aspect, the equivalent ratio between (i) the concentration of thiol groups and (ii) the concentration of meth(acrylate) groups and, if present of polymerizable ethylenically unsaturated groups preferably is 1 or less, wherein said concentrations are expressed in milli-equivalents (meq) per gram of solid contained in the aqueous dispersion of the invention. Typically said ratio is 0.5 or less, often 0.45 or less. Preferably, said ratio is 0.35 or less, often 0.34 or less. Often, said ratio is 0.32 or less, even 0.30 or less.

Typically, said ratio is 0.001 or more, usually 0.01 or more. Preferably, said ratio is 0.04 or more, more preferably 0.10 or more, most preferably 0.15 or more.

Typically the total amount of (meth)acrylated groups and, if present of polymerizable ethylenically unsaturated groups is at least 2.0 meq, more typically at least 2.5 meq per gram of solid contained in the first dispersion. Preferably, this amount is at least 3.0 meq, usually at least 3.2 meq or at least 3.5 meq. More preferably this amount is at least 4 meq, most preferably at least 5 meq per gram of solid contained in the first dispersion.

Preferably the total amount of (meth)acrylated groups and, if present, of polymerizable ethylenically unsaturated groups, does not exceed 10 meq per gram of solid contained in the first dispersion.

The amount of (meth)acrylated and, if present, of ethylenically unsaturated groups is usually measured by nuclear magnetic resonance spectroscopy and is expressed in meq per g of solid material. A sample of the composition is dried for 1 day at room temperature and 12 h at 60° C. and then dissolved in N-methylpyrolidinone. The sample is submitted to $^1$H-NMR analysis in order to measure the molar concentration of (meth)acrylated and ethylenically unsaturated groups using 1,3,5-bromobenzene as internal standard. The comparison between the peak assigned to aromatic protons of the internal standard and the peaks assigned to the (meth)acrylated and ethylenically unsaturated double bonds allow to calculate the molar concentration of (meth)acrylated and ethylenically unsaturated groups according to the formula (A×B)/C wherein A is the integration of $^1$H double bonds provided by the sample, B is the number of moles of the internal standard in the sample and C is the integration of $^1$H provided by the internal standard. Amounts of the (meth)acrylated groups and of the ethylenically unsaturated groups are typically expressed in meq per gram of solid material.

Alternatively, the amount of (meth)acrylated and, if present, of ethylenically unsaturated groups can also be measured by a titration method following the addition of an excess of pyridinium sulfate dibromide on said unsaturated groups (within glacial acetic acid as solvent and mercury acetate as catalyst). Said excess liberates iodine in the presence of potassium iodide and the iodine is then titrated with sodium thiosulfate.

In an embodiment of the first aspect, said (meth)acrylated pre-polymer (A) present in, more in particular dispersed in the first dispersion may be selected from the group consisting of (meth)acrylated (poly)urethane pre-polymers (A), (meth)acrylated poly(meth)acrylate pre-polymers (A), (meth)acrylated epoxy pre-polymers (A) and/or (meth)acrylated polyester pre-polymers (A). Preferred are (meth)acrylated (poly)urethane pre-polymers (A), (meth)acrylated epoxy pre-polymers (A) and/or (meth)acrylated poly(meth)acrylate pre-polymers (A). More preferred are (meth)acrylated (poly)urethane pre-polymers (A), (meth)acrylated poly(meth)acrylate pre-polymers (A), and mixtures thereof. Most preferred are (meth)acrylated (poly)urethane pre-polymers (A), and in particular (meth)acrylated polyurethane pre-polymers (A).

Suitable (meth)acrylated (poly)urethane pre-polymers (A) include anionically, cationically or nonionically stabilized (poly)urethane (meth)acrylate colloids in a liquid medium as specified above, typically water. They are well known in the art. Conventionally, to facilitate manufacture, the (poly)urethane pre-polymer (A) can be made in the presence of a solvent that is either left in the dispersion, or removed as one of the last steps in production to provide a low solvent or preferably a solvent-free product. Solvents that can be easily removed are usually volatile solvents, such as acetone or methyl ethyl ketone. In place of such solvents (or a portion of such solvents), however, one or more reactive diluents may be used.

In an embodiment of the first aspect, the first dispersion comprises at least one (meth)acrylated (poly)urethane pre-polymer (A) and, optionally, at least one ethylenically unsaturated compound (C).

The (meth)acrylated (poly)urethane pre-polymer (A) may be obtained (or obtainable) from the reaction of:
  at least one polyisocyanate compound (ia),
  preferably, at least one polyol (iia),
  at least one hydrophilic compound (iiia) containing at least one reactive group capable to react with isocyanate groups, said hydrophilic compound (iiia) being capable to render the (poly)urethane pre-polymer dispersible in aqueous medium either directly or after the reaction with a neutralizing agent to provide a salt, and
  at least one (meth)acrylated compound (va) containing at least one, preferably essentially one reactive group capable to react with isocyanate groups.

Typically said first dispersion then comprises a total amount of (meth)acrylated and, if present of polymerizable ethylenically unsaturated groups of at least 3 meq per total weight in grams of (ia), (iia), (iiia), (va) and (C). Typically this amount is at least 3.2 meq, preferably at least 3.5 meq, more preferably at least 4.0 meq, even more preferably at least 5.0 meq per total weight in grams of (ia), (iia), (iiia), (va) and (C). Preferably the total amount of (meth)acrylated and polymerisable ethylenically unsaturated groups does not exceed 10 meq of (meth)acrylated and polymerisable ethylenically unsaturated groups per total weight in g of compounds (ia), (iia), (iiia), (va) and (C).

In an even more preferred embodiment of this first aspect, the (meth)acrylated (poly)urethane pre-polymer (A), which typically is a (meth)acrylated polyurethane pre-polymer (A), is obtained (or obtainable) from the reaction of:
at least one polyisocyanate compound (ia),
optionally, at least one polyol (iia),
at least one hydrophilic compound (iiia) containing at least one reactive group capable to react with isocyanate groups, said hydrophilic compound (iiia) being capable to render the (poly)urethane pre-polymer dispersible in aqueous medium either directly or after the reaction with a neutralizing agent to provide a salt,
at least one (meth)acrylated compound (iva) containing at least two reactive groups capable to react with isocyanate groups, and
at least one (meth)acrylated compound (va) containing at least one, preferably essentially one reactive group capable to react with isocyanate groups.

Typically said first dispersion then comprises a total amount of (meth)acrylated and, if present of polymerizable ethylenically unsaturated groups of at least 3 meq per total weight in grams of (ia), (iia), (iiia), (va), (iva) and (C). Typically this amount is at least 3.2 meq, preferably at least 3.5 meq, more preferably at least 4.0 meq, even more preferably at least 5.0 meq per total weight in grams of (ia), (iia), (iiia), (va), (iva) and (C). Preferably the total amount of (meth)acrylated and polymerisable ethylenically unsaturated groups does not exceed 10 meq of (meth)acrylated and polymerisable ethylenically unsaturated groups per total weight in g of compounds (ia), (iia), (iiia), (va), (iva) and (C).

Even more preferably, the total amount of (meth)acrylated groups in the (meth)acrylated (poly)urethane (preferably polyurethane) pre-polymer (A) contained in said first dispersion is at least 3.0 meq, especially at least 3.5 meq, preferably at least 4.0 meq, or even at least 5.0 meq per total weight in g of compounds (ia), (iia), (iiia), (va) and (iva).

By polyisocyanate compound (ia) is meant to designate organic compounds comprising at least two isocyanate groups. Suitable polyisocyanate compounds (ia) include diisocyanates, triisocyanates, and other polyisocyanates. Preferred polyisocyanate compounds (ia) for practicing the invention are polyisocyanates having 4 to 25 carbon atoms and from 2 to 4 isocyanate groups per molecule, however, the polyisocyanate compound usually comprises not more than three isocyanate groups. More preferably, the one or more polyisocyanates (ia) are independently selected from the list consisting of di-isocyanates and tri-isocyanates.

The polyisocyanate compound (ia) is most preferably a di-isocyanate.

The polyisocyanate compound (ia) is generally selected from aliphatic, cycloaliphatic, aromatic and/or heterocyclic polyisocyanates or combinations thereof.

Suitable examples of aliphatic, cycloaliphatic and aromatic polyisocyanates can be found in US 2009/270581, paragraphs [0031] and [0032], incorporated by reference herein.

The polyisocyanate (ia) is preferably selected from aliphatic and cycloaliphatic polyisocyanates, most preferably diisocyanates. Especially preferred is 1,1'-methylene bis[4-isocyanato cyclohexane].

The amount of polyisocyanate compound (ia) used for the synthesis of the (meth)acrylated (poly)urethane pre-polymer (A) is generally in the range of from 10 to 60 wt % of the (meth)acrylated (poly)urethane pre-polymer (A), preferably from 20 to 50 wt % and more preferably from 30 to 40 wt %.

By polyol (iia) is meant to designate a polyol comprising at least two hydroxyl groups. The polyol (iia) can be selected from high molecular weight polyols having a number average molecular weight of at least 400, low molecular weight polyols having a number average weight of lower than 400 or any mixtures thereof. The high molecular weight polyol (iia) preferably has a number average molecular weight which does not exceed 5000, preferably not 2000, more preferably not 1000 Daltons.

Examples of such high molecular weight polyols are polyester polyols, polyether polyols, polycarbonate polyols, fatty dimer diols, polybutadiene polyols, silicone polyols and polyacrylate polyols, as well as combinations thereof. Suitable examples of such polyols can be found in US 2009/270581, paragraphs [0035] to [0038], incorporated by reference herein.

Preferred are polyester, polyether and polycarbonate polyols.

Polyester polyols are particularly preferred, especially the hydroxyl terminated reaction products of polyhydric, preferably dihydric, alcohols with polycarboxylic, preferably dicarboxylic, acids or their corresponding anhydrides, as well as those obtained from the ring opening polymerization of lactones. Examples of polycarboxylic acids and of polyhydric alcohols that may be used for the formation of these polyester polyols can be found in US 2009/270581, paragraph [0040], incorporated by reference herein Particularly preferred are polyester polyols made from the polycondensation of neopentylglycol and adipic acid and/or isophthalic acid.

Examples of low molecular weight polyols that may be used are ethyleneglycol, diethyleneglycol, propyleneglycol, dipropyleneglycol, neopentyl glycol, 1,3-propane diol, 2-ethyl-2-butyl-1,3-propanediol, 1,3-butanediol, 1,4-butanediol, 1,5-pentanediol, 1,6-hexanediol, 1,7-heptanediol, 1,8-octanediol, 2-ethyl-1,6-hexanediol, cyclohexane dimethanol, trimethylolpropane, di-trimethylol propane, glycerol, pentaerythritol and di-pentaerythritol.

According to specific embodiment of the invention, a high molecular weight polyol is used in the preparation of the (meth)acrylated (poly)urethane pre-polymer (A).

According to another specific embodiment of the invention, a mixture of high molecular weight polyols and low molecular weight polyols is used.

The total amount of polyol (iia) in the (meth)acrylated (poly)urethane pre-polymer (A) is preferably of from 2 to 50% by weight of the (meth)acrylated (poly)urethane pre-polymer (A), more preferably of from 3 to 30% by weight, most preferably of from 5 to 15% by weight.

The hydrophilic compound (iiia) may comprise at least one reactive group capable to react with isocyanate groups and at least one functional group which is capable to render the (poly)urethane pre-polymer (A) dispersible in aqueous medium either directly or after reaction with a neutralizing agent to provide a salt.

As used throughout the invention and unless provided otherwise, the term "reactive group capable to react with isocyanate groups" is generally a nucleophilic functional group. It may comprise hydroxyl groups, thiol groups, primary amine groups or secondary amine groups amongst others. Preferably, hydroxyl groups are used.

Said at least one functional group which is capable to render the (poly)urethane pre-polymer (A) dispersible in aqueous medium is generally a functional hydrophilic group that can exhibit an ionic or non-ionic hydrophilic nature.

By hydrophilic group is meant to designate a group that is either ionic, such as for example a carboxylate or sulfonate group, or that becomes ionic after reaction with a neutralizing agent forming a salt, such as a carboxylic acid, sulfonic acid, or an amino group.

Said at least one functional group which is capable to render the (poly)urethane pre-polymer (A) dispersible in aqueous medium is preferably one or more anionic salt groups, such as a carboxylate and sulfonate salt groups or acid groups which may be converted to an anionic salt group, such as carboxylic acid or sulfonic acid groups.

Said hydrophilic compound (iiia) is generally a polyol comprising a functional group that can exhibit an ionic or non-ionic hydrophilic nature. Preferably, the hydrophilic compound (iiia) comprises at least one carboxylic acid group which is capable to render the (poly)urethane pre-polymer dispersible in aqueous medium either directly or after the reaction with a neutralizing agent to provide a salt.

Preferred are hydroxycarboxylic acids represented by the general formula $(HO)_xR(COOH)_y$, wherein R represents a straight or branched hydrocarbon residue having 1 to 12 carbon atoms, and x and y independently are integers from 1 to 3. Examples of these hydroxycarboxylic acids include citric acid, malic acid, lactic acid and tartaric acid. The most preferred hydroxycarboxylic acids are the $\alpha,\alpha$-dimethylolalkanoic acids, wherein x=2 and y=1 in the above general formula, such as for example, 2,2-dimethylol propionic acid and 2,2-dimethylolbutanoic acid. Alternatively, for water dispersibility, basic salt forming groups can be introduced into the polymers by reacting a suitable compound (e.g., a polyisocyanate) with a compound containing active hydrogen groups and active basic groups neutralized with an acid. Active hydrogen and active acid groups include hydroxy and mercapto carboxylic acids, aminocarboxylic acids, aminohydroxy carboxylic acids, sulfonic acids, hydroxy sulfonic acids, and aminosulfonic acids. Suitable compounds having active hydrogen groups and active basic groups include aliphatic, cycloaliphatic and heterocyclic amino alcohols, diols and triols, amines, diamines, triamines, tetramines, and amides. Suitable neutralizing acids include organic acids such as formic acid and acetic acid, and inorganic acids such as hydrochloric acid and sulfuric acid.

The amount hydrophilic compound (iiia) generally is from 1 to 25% by weight of the (meth)acrylated (poly)urethane pre-polymer (A), preferably of from 4 to 10% by weight.

By (meth)acrylated compound (va) containing at least one reactive group capable to react with isocyanate groups, it is meant to designate in the present invention compounds comprising at least one (meth)acrylated function such as acrylic or methacrylic group and at least one reactive group (typically a nucleophilic functional group) capable of reacting with isocyanate, which preferably are hydroxyl groups.

Preferred are (meth)acrylated compounds (va) containing essentially one reactive group capable to react with isocyanate groups. "(Meth)acrylated compounds (va) containing essentially one reactive group capable to react with isocyanate groups may be meant to designate in the present invention compounds comprising at least one unsaturated function such as acrylic or methacrylic group and comprising essentially one nucleophilic function capable of reacting with isocyanate. Preferred are (meth)acryloyl mono-hydroxy compounds, more particularly poly(meth)acryloyl mono-hydroxy compounds. If the hydroxyl-functional (meth)acrylates comprise more than one (meth) acrylate functions, they can comprise for instance from 2 to 5 methacrylate functions. Acrylates are particularly preferred.

Useful compounds (va) include the esterification products of aliphatic and/or aromatic polyols with (meth)acrylic acid having a residual average hydroxyl functionality of about 1. The partial esterification products of (meth)acrylic acid with tri-, tetra-, penta- or hexahydric polyols or mixtures thereof are preferred. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are $\gamma$-butyrolactone and, in particular $\delta$-valerolactone and $\epsilon$-caprolactone. These modified or unmodified polyols are partly esterified with acrylic acid, methacrylic acid or mixtures thereof until the desired residual hydroxyl functionality is reached.

Compounds (va) obtained from the reaction of (meth)acrylic acid with aliphatic, cycloaliphatic or aromatic compounds bearing an epoxy functionality together with at least one (meth)acrylic functionality can be used as well.

Other suitable compounds (va) are the (meth)acrylic esters with linear and branched polyols in which at least one hydroxy functionality remains free, like hydroxyalkyl(meth)acrylates having 1 to 20 carbon atoms in the alkyl group. Examples of suitable hydroxy-functional (meth)acrylates include alkyl and cycloalkyl hydroxy-functional (meth)acrylates, such as 2-hydroxyethyl(meth)acrylates, 3-hydroxypropyl(meth)acrylates, 4-hydroxybutyl(meth)acrylates, 2-hydroxy-2-methylethyl(meth)acrylates, and 4-hydroxycyclohexyl(meth)acrylates, as well as other similar hydroxy-functional aliphatic(meth)acrylates. Other suitable hydroxy-functional (meth)acrylates include hydroxy-functional (meth)acrylate polyesters such as caprolactone 2-((meth)acryloyloxy)ethyl esters, dicaprolactone 2-((meth)acryloyloxy)ethyl esters, and higher molecular weight caprolactone homologues, and hydroxy-functional (meth)acrylate polyethers.

Particularly preferred are compounds comprising at least two (meth)acryl functions such as glycerol diacrylate, trimethylolpropane diacrylate, glycerol diacrylate, pentaerythritol triacrylate, ditrimethylolpropane triacrylate, dipentaerythritol pentaacrylate and their (poly)ethoxylated and/or (poly)propoxylated equivalents.

The amount of compound (va) generally is from 10 to 60% by weight of the (meth)acrylated (poly)urethane pre-polymer (A), preferably of from 30 to 50% by weight.

By (meth)acrylated compound (iva) containing at least two reactive groups capable to react with isocyanate groups and at least one (meth)acrylated group is meant to designate in the present invention compounds comprising at least one (meth)acrylated function such as acrylic or methacrylic groups and at least two nucleophilic functions capable of reacting with isocyanate groups, which preferably are hydroxyl functions.

Preferred are (meth)acryloyl dihydroxy compounds and poly(meth)acryloyl dihydroxy compounds.

Compounds (iva) comprising two hydroxyl functions and at least two (meth)acrylate functions are preferred. Acrylates are particularly preferred.

Particularly preferred compounds (iva) are those obtained from the reaction of diglycidyl compounds with (meth)acrylic acid.

Aliphatic diglycidyl compounds derived from alpha, omega diols having 4 to 12 carbon atoms or from polyoxyalkylenediols, especially polyethylene glycol, polypropylene glycol or mixtures thereof that contain oxyalkylene groups, can be used. Preference is given, for example, to 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, hydrogenated bisphenol A diglycidyl ether and hydrogenated bisphenol F diglycidyl ether and their ethoxylated and/or propoxylated equivalents. It is also possible to employ diglycidyl esters, such as diglycidyl hexahydrophthalate. Aromatic diglycidyl compounds derived from bisphenol A and bisphenol F are preferred. Particularly preferred are bisphenol A diglycidyl ether, bisphenol F diglycidyl ether and their ethoxylated and/or propoxylated equivalents. It is also possible to employ diglycidyl esters, such as diglycidyl phthalate, N,N-diglycidyl aniline, N,N-diglycidyl-4-glycidyloxyaniline. Especially preferred is the diacrylate ester of bisphenol A diglycidylether.

Compounds (iva) obtained from partial esterification of aliphatic or aromatic polyhydric polyols with (meth)acrylic acid and having a residual average hydroxyl functionality of at least 2.0 in the molecule, can also be used. In this context, it is also possible to use the reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. Preferred are those alkoxylated polyols having not more than two alkoxy groups per hydroxyl functionality and ε-caprolactone-modified polyols. It is known to those skilled in the art that the (meth)acrylation of polyols such as glycerol, trimethylolpropane, pentaerythritol, di-trimethylolpropane or di-pentaerythritol proceeds to a mixture of mono-, di-, tri-, tetra-, penta- and hexa(meth)acrylate and that a possible way to characterize the mixture is by measuring its hydroxyl value. Examples are glycerol mono-(meth)acrylate, trimethylolpropane mono-(meth)acrylate, pentaerythritol di-(meth)acrylate, di-trimethylolpropane di-(meth)acrylate, di-pentaerythritol tetra-(meth)acrylate and their polyethoxylated and/or polypropoxylated equivalents.

Compounds (iva) obtained from the hydrolysis of aliphatic, cycloaliphatic or aromatic compounds bearing an epoxy functionality together with at least one (meth)acrylic functionality can be used as well. Particularly suitable are the products resulting from the hydrolysis of glycidyl(meth) acrylate, i.e. 1,2-dihydroxy-3-(meth)acryloyl-propane.

The amount of compound (iva) generally is from 5 to 30% by weight of the (meth)acrylated (poly)urethane pre-polymer (A), preferably of from 10 to 20% by weight.

In an embodiment of the first aspect, said (meth)acrylated (poly)urethane pre-polymers (A) may be obtained (or obtainable) by a process comprising
a first step comprising the reaction of compounds (ia), (iiia), optionally said (meth)acrylated compound (iva), and optionally said compound (iia),
a second step, comprising the reaction of the product of the first step with said (meth)acrylated compound (va) so that an end-capped (meth)acrylated (poly)urethane pre-polymer is obtained;
the dispersion in an aqueous medium of said end-capped (meth)acrylated (poly)urethane pre-polymer obtained after the second step,
an optional step comprising the reaction with a neutralizing agent in order to convert the hydrophilic groups (e.g. the carboxylic acid groups) provided by compound (iiia) into anionic salts,
an optional step wherein the (meth)acrylated (poly)urethane pre-polymer obtained after the second step is reacted with a chain extender (via), and
an optional step comprising the addition of an ethylenically unsaturated compound (C).

If a chain extender (via) is used, this is preferably added during or after the dispersion of the end-capped (meth) acrylated (poly)urethane pre-polymer in an aqueous medium.

The addition of the optional ethylenically unsaturated compound (C) can be done after the second step of the reaction. When the ethylenically unsaturated compound (C) is a compound comprising no functional groups which are capable to react with isocyanate groups, the compound can be added before or during the second step of the reaction. According to a preferred embodiment of the invention, the compound (C) is added to the reaction mixture together with compounds (va).

According to another preferred embodiment of the invention, part of compound (C) is added to the reaction mixture together with compound (va) and another part of compound (C) is added to the reaction mixture after the second step. In this case, the same or different compounds (C) can be used.

In addition to compound (C) or in replacement of compound (C), non ethylenically unsaturated compounds (D) can also be added before, during or after the second step of the reaction. These compounds (D) are preferably selected from siliconated and/or hydroxylated polyacrylates such as Silclean®3700. The amount of compound (D) is generally between 0 and 30% by weight, preferably between 0 and 10% by weight of compound (D) to the total amount of (meth)acrylated (poly)urethane pre-polymer (A) and optionally compound (C).

This process can be carried out by reacting a stoechiometric excess of compound (ia) with compounds (iia), (iiia) and (iva), preferably under substantially anhydrous conditions and at a temperature between 30° C. and 130° C., more preferably between 70° C. and 100° C., until the reaction between the isocyanate groups and the isocyanate-reactive groups is substantially complete. The isocyanate content can be followed by titration with an amine. The reactants are generally used in proportions corresponding to an equivalent ratio of isocyanate groups provided by compound (ia) to isocyanate-reactive groups provided by compounds (iia), (iiia) and (iva) of from about 1.1:1 to about 2:1, preferably from about 1.4:1 to 1.8:1. The reaction may be facilitated by the addition of from 5 to 40%, preferably 15 to 25%, by weight of a solvent in order to reduce the viscosity of the pre-polymer. The solvent is preferably acetone or methylethylketone. During this process, it is common to use catalysts to accelerate the reaction of the isocyanates towards hydroxyls and to use inhibitors in order to prevent the radical reaction of the reactive unsaturations. It is possible in the frame of this invention to use a sequential process during which compound (ia) and/or compounds (iia), (iiia) and/or (iva) are added incrementally in two or several portions, or with a continuous feed. The reason for this is a better control on the exothermicity of the reaction, especially when no solvent is present.

The compounds (iia), (iiia) and (iva) are preferably used in a molar ratio (iia):(iiia):(iva) of 1:1:1 to 1:10:10, more preferably from 1:1:1 to 1:5:5.

In a subsequent step, the isocyanate-terminated (poly) urethane pre-polymer is reacted with compound (va), preferably in the same conditions as for the previous step. The reactants are generally used in proportions corresponding to an equivalent ratio of isocyanate groups provided by the pre-polymer obtained in the first step to isocyanate-reactive groups provided by compound (va) of from about 2:1 to 1:1, preferably from about 1.7:1 to 1.25:1. The isocyanate content can be followed by titration with an amine.

In general, the pre-polymer obtained after the reaction of (ia), (iia), (iiia), (iva) and (va) is dispersed in an aqueous medium by adding the pre-polymer slowly into water or reversely by adding water to the pre-polymer. Usually this dispersion proceeds under high sheer mixing. Usually the dispersion requires the preliminary neutralization of the hydrophilic groups provided by compound (iiia), such as the carboxylic acid or sulfonic acid groups into anionic salts. This is generally done by adding an organic or inorganic neutralizing agent to the pre-polymer or the water. Suitable neutralizing agents are bases. Suitable neutralizing agents can be found in US 2009/270581, paragraph [0023], incorporated by reference herein.

The total amount of these neutralizing agents can be calculated according to the total amount of acid groups to be neutralized. Generally a stoechiometric ratio of about 1:1 is used.

In general, the relative quantities of compounds (ia), (iia), (iiia), (iva) and (va) are such that a stoechiometric excess of compound (ia) to compounds (iia), (iiia), (iva) and (va) is used so that a fraction of isocyanate functional (meth) acrylated (poly)urethane pre-polymer is obtained, that is a pre-polymer comprising still some residual isocyanate groups. A suitable (meth)acrylated (poly)urethane pre-polymer A is then typically obtained from the capping or the chain extension of an isocyanate-terminated (poly)urethane oligomer with a mono or poly(meth)acrylated molecule containing at least one reactive group capable to react with isocyanate groups, such as a hydroxyl group. Chain extension, if desired, typically is provided by a polyamine compound. Therefore, a further compound (via) is optionally added comprising active amino groups capable of making a chain extension of the remaining isocyanate end-groups of the pre-polymer. In other words, this isocyanate functional pre-polymer fraction can be chain-extended with an active hydrogen-containing chain extender in the aqueous phase, generally at a temperature between 5° C. and 90° C., preferably of 15° C. to 30° C. Water can act as chain extender. The chain extender is suitably a water-soluble aliphatic, alicyclic, aromatic or heterocyclic primary or secondary polyamine or hydrazine having up to 60, preferably up to 12 carbon atoms. The total amount of compound (via) used is generally calculated according to the amount of residual isocyanate groups present in the (poly)urethane pre-polymer. The ratio of isocyanate groups in the pre-polymer to the amine groups in the chain extender (via) during the chain extension is generally in the range of from about 1:0.7 to about 1:1, preferably from about 1:0.9 to about 1:1 on an equivalent basis. This ratio is more preferably 1:1 in order to obtain a fully reacted (poly)urethane polymer with no residual free isocyanate groups.

The polyamine used has preferably an average functionality of 2 to 4, more preferably 2 to 3. Aside from water, examples of suitable chain extenders can be found in US 2009/270581, paragraph [0026], incorporated by reference herein.

Preferably no chain extender compound (via) is used.

In general, after the formation of the dispersion of the (meth)acrylated (poly)urethane pre-polymer (A) and when it contains a volatile solvent with a boiling point of below 100° C., the polymer dispersion is stripped. This is usually done under reduced pressure and at a temperature between 20 and 90° C., preferably 40 to 60° C.

The aqueous dispersion according to the invention preferably also comprises at least one ethylenically unsaturated compound (C), that is a compound comprising at least one unsaturated function such as an acrylic, methacrylic or allylic group, more particularly a (poly)(meth)acryloyl-containing compound. Acrylates are preferred.

The ethylenically unsaturated compound (C) can be selected from the (meth)acrylated compounds (iva) and (va) as described here above or can be an ethylenically unsaturated compound which comprises no functionality which is capable to react with an isocyanate group.

The compound (C) is preferably selected from (meth) acrylated compounds (va) and/or from ethylenically unsaturated compounds comprising no functionality which is capable to react with an isocyanate group.

Aliphatic and aromatic polyhydric polyols which have been totally esterified with (meth)acrylic acid and contain substantially no residual hydroxyl functionality in the molecule are particularly preferred. Suitable are the esterification products of (meth)acrylic acid with tri-, tetra-, penta- and/or hexahydric polyols and mixtures thereof. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. Compounds employed with preference are alkoxylated polyols having no more than two alkoxy groups per hydroxyl functionality, and ε-caprolactone-modified polyols. These modified or unmodified polyols are preferably totally esterified with acrylic acid, methacrylic acid or mixtures thereof until substantially no residual hydroxyl functionality remains. Examples of poly-unsaturated compounds from this category are trimethylolpropane tri-acrylate, glycerol tri-acrylate, pentaerythritol tetra-acrylate, di-trimethylolpropane tetra-acrylate, di-pentaerythritol hexa-acrylate and their (poly)ethoxylated and/or (poly)propoxylated equivalents, as well as mixtures thereof.

It is also possible to use any compound from the category of urethane(meth)acrylates, epoxy(meth)acrylates, polyester (meth)acrylates and (meth)acrylic(meth)acrylates or mixtures thereof. Urethane(meth)acrylates (C) advantageously are different from the (meth)acrylated (poly)urethanes pre-polymers (A) of the invention.

The compound (C) can also be an ethylenically unsaturated compound bearing one or more additional functional groups or side-chains providing additional properties to the polymer. Siliconated and/or fluorinated ethylenically unsaturated compounds such as the products commercialized under the names of IRR 154 and ADDITOL® HGX83 are particularly suitable.

The amount of ethylenically unsaturated compound (C) used is generally between 0 and 50% by weight, preferably between 5 and 50% by weight, more preferably between 20 and 30% by weight of compound (C) to the total amount of (meth)acrylated (poly)urethane pre-polymer (A).

Instead of, or in addition to the (meth)acrylated (poly) urethane pre-polymers (A), the first dispersion may also comprise at least one other (meth)acrylated pre-polymer (A') selected from the group consisting of (meth)acrylated poly (meth)acrylate pre-polymers, (meth)acrylated epoxy pre-polymers and/or (meth)acrylated polyester pre-polymers.

Suitable (meth)acrylated epoxy pre-polymers (A') include neutral (meth)acrylated epoxy pre-polymers (A) and ionic (meth)acrylated epoxy pre-polymers (A). Neutral (meth) acrylated epoxy pre-polymers (A') include polyepoxy (meth)acrylates such as described in U.S. Pat. No. 5,548,005. In an embodiment of the first aspect, said (meth)acrylated epoxy pre-polymers (A') may be obtained from the reaction of acrylic acid or methacrylic acid with a hydrophilic polyepoxy that contains lateral polyethylene(propylene) glycol segments. A hydrophilic polyepoxide of this type can be prepared by reacting a polyepoxide with a primary or secondary polyethylene(propylene) glycol monoether amine (such as Jeffamine®), or by reacting an OH-group containing polyepoxide with a diisocyanate or polyisocyanate and thereafter with a polyethylene(propylene) glycol monoether. Ionic water dispersible epoxy acrylate which contain both quaternary ammonium and phosphate anion groups may be obtainable according to U.S. Pat. No. 5,512,607 by the reaction of an epoxy resin with phosphoric acid or ester and with tertiary amine. U.S. Pat. No. 4,444,923 discloses an ionic polymer obtained from an epoxy resin esterified with a polymer containing carboxylic acid groups, further free acid groups being neutralised with a tertiary amine.

Suitable (meth)acrylated poly(meth)acrylate pre-polymers (A') may be obtained from the reaction of (i) a water-dispersible (meth)acrylic polymer (F) containing pendant hydroxyl or isocyanate groups, (ii) at least one ethylenically unsaturated compound (G) which can be radically polymerized under irradiation and which attaches to the (meth)acrylic polymer (F) by an urethane linkage, and optionally, (iii) at least one neutralizing agent (H). Compounds (G) preferably are selected from polyethylenically unsaturated compounds and, optionally, from monoethylenically unsaturated compounds. Preferably compounds (G) are polyethylenically unsaturated compounds. Such compounds and ways to produce them are described in EP 10170858.

Suitable (meth)acrylated polyester pre-polymers (A') may be obtained by reacting a hydroxyl group-containing polyester backbone with (meth)acrylic acid, or by reacting a carboxyl group-containing polyester backbone with a hydroxyalkyl(meth)acrylate such as for example 2-hydroxyethyl acrylate, 2- or 3-hydroxypropyl acrylate, etc. or with glycidyl methacrylate. The polyester backbone can be obtained in a conventional manner by polycondensation of at least one mono- and/or polyhydroxy alcohol, such as ethylene glycol, propylene glycol, butanediol, neopentyl glycol, hexanediol, trimethylolpropane, bisphenol A, pentaerythritol, etc, and/or the ethoxylates and/or propoxylates thereof, with at least one mono- and/or polycarboxylic acid such as adipic acid, phthalic acid, isophthalic acid, terephthalic acid, trimellitic acid, etc. By using unsaturated compounds for the polyester synthesis, such as for example fumaric acid, maleic acid, itaconic acid, etc., polyesters bearing both (meth)acrylic and ethylenic unsaturations in the polymer chain, can be obtained. In addition polylactones can be used as polyester backbone. For example poly(ε-caprolactone) obtained by ring-opening polymerization of ε-caprolactone, optionally in the presence of one or more polyhydroxy alcohols, can be used. It is possible to introduce any desired ionic group and/or nonionic group for the stable dispersion of the polymer in water. An example of monomer useful for that purpose is 5-sodiosulfo-isophtalic acid (SSIPA).

In an embodiment of the first aspect, compound (B) is selected from thiol-functional compounds and/or amino-functional compounds. Compounds (B) typically contain less than 1 wt %, more typically less than 0.5 wt %, most typically less than 0.05 wt % of ethylenically unsaturated groups, in casu (meth)acrylated groups, relative to the total weight of said compound (B). Preferred are thiol-functional compounds (B).

Compounds (B) advantageously are different from the (meth)acrylated pre-polymer (A), in casu (meth)acrylated (poly)urethane pre-polymers (A) contained in the first dispersion.

In an embodiment of the first aspect, the at least one thiol-functional compound (B) contained in the second dispersion may comprise at least one thiol-functional (poly)urethane pre-polymer (B1) which carries groups which impart water dispersibility to the (poly)urethane and/or at least one thiol-functional pre-polymer (B2) which carries groups which impart water dispersibility to the pre-polymer (B2), and which is prepared from monomers capable of free radical polymerization and having C=C double bonds by the method of free radical mass or solution polymerization.

The thiol-functional (poly)urethane pre-polymer (B1) and the thiol-functional pre-polymer (B2) may be carrying from 0.05 to 5 meq of thiol groups per gram, typically from 0.5 to 4 meq, more typically from 1 to 3 meq of thiol groups per gram of thiol functional (poly)urethane pre-polymer (B1) or thiol-functional pre-polymer (B2) respectively.

The thiol-functional (poly)urethane pre-polymer (B1) may be obtained (or obtainable) from the reaction of:
- at least one polyisocyanate compound (ib),
- at least one polyol (iib),
- at least one hydrophilic compound (iiib) containing at least one reactive group capable to react with isocyanate groups, said hydrophilic compound (iiib) being capable to render the (poly)urethane pre-polymer (B1) dispersible in aqueous medium either directly or after the reaction with a neutralizing agent to provide a salt, and
- at least one compound (ivb) containing at least two functional groups of which a first functional group is a thiol group and a second functional group is a reactive group capable to react with an isocyanate group.

Suitable compounds (ib), (iib) and (iiib) may be those as defined above for compounds (ia), (iia) and (iiia) respectfully.

Preferably, if compound (ivb) comprises a functional group, which is a reactive group capable to react with an isocyanate group, and which is not a thiol group (e.g. a hydroxyl or amine group), said compound (ivb) comprises at least one thiol group (e.g. only the first functional group or the first functional group and one or more additional thiol groups).

Preferably, if in compound (ivb) the only group capable to react with an isocyanate group is a thiol group, said compound (ivb) comprises at least two thiol groups (the first functional group and one or more additional thiol groups)

In an embodiment, compound (ivb) comprises at least two thiol groups.

In an embodiment, compound (ivb) comprises at least two thiol groups and no other reactive groups capable to react with an isocyanate group or comprises one or more thiol groups as well as one or more groups (preferably one), other than thiol groups, capable to react with an isocyanate group.

Preferably compounds (ivb) are selected from hydroxyl functional thiol compounds and/or from polythiol compounds obtained (or obtainable) from the reaction of a polyol and a thioaliphatic carboxylic acid, wherein all or some of the hydroxyl groups of the polyol are esterified.

Non-limiting examples of suitable hydroxyl functional thiol compounds (ivb) are $HS-CH_2-CH_2-OH$, $HO-CH_2-CHOH-CH_2-SH$, and mixtures thereof.

Suitable polythiol compounds (ivb) are described in U.S. Pat. No. 6,310,161. Polythiol compounds (ivb) may e.g. be obtained (or obtainable) from the reaction of:

(i) a polyol, such as an aliphatic glycol (diol), triol, tetrol, pentol, or hexol, and (ii) a thiocarboxylic acid of the formula HS—$(C_nH_{2n})$—$CO_2H$, wherein n is 1, 2, 3, 4, 5, 6, 7, 8, 9, or 10, and wherein the —SH moiety can alternatively be located on an internal carbon, as opposed to the terminal carbon atom. Additionally, one or more hydroxyl groups can optionally be attached to carbon atoms in the chain.

Examples of suitable polyols that may be used for the preparation of polythiol compounds (ivb) include, but are not limited to ethylene glycol, propylene glycol, alkylene glycol, trimethylolpropane, pentaerythritol, sorbitol, mannitol, trimethylolethane, trimethylolbutane, trimethylolpropane, trimethylolalkane, dipentaerythritol, cyclohexane-1,2,4-trimethanol, tripentaerythritol, hexahydroxycyclohexane, pentahydroxycyclopentane, trihydroxycycloheptane, glycerine, other carbohydrates, trimethylolisopropylmethane, trimethylolheptadecane, and/or benzene-1,2,4,5-tetramethanol. Examples of suitable thiocaboxylic acids that may be used for the preparation of polythiol compounds (ivb) include, but are not limited to thioglyclic acid, thiolactic acid, α-mercaptopropionic acid, β-mercaptopropionic acid, mercaptoacetic acid, mercaptovaleric acid, mercaptobutyric acidand/or mercaptohexanoic acid.

Non-limiting examples of polythiols (ivb) which are suitable for use in the present invention include, but are not limited to: glycol dimercaptoacetate, glycol dimercaptopropionate, pentaerythritol tetra-(3-mercaptopropionate), pentaerythritol tri-(3-mercaptopropionate), pentaerythritol tetrathioglycolate, polyethylene glycol dimercaptoacetate, trimethylolpropane tri-(3-mercaptopropionate), and trimethylolpropane trithioglycolate. Particularly preferred are pentaerythritol tetra(3-mercaptopropionate) and/or trimethylolpropane tri-(3-mercaptopropionate).

Examples of suitable thiol-functional (poly)urethane pre-polymers (B1) and their preparation are given in US 20040091716, paragraphs [214] to [218], and in DE-A-2642073.

In an embodiment, the thiol-functional pre-polymer (B2) may be obtained (or obtainable) from the reaction of: (i) a water-dispersible poly(meth)acrylate (K) containing pendant groups that are capable to react with thiol groups or with hydroxyl groups and (ii) at least one compound (ivb) containing at least two functional groups of which a first functional group is a thiol group and a second functional group is a reactive group capable to react with said pendant group. The pendant groups that are capable to react with thiol groups or with hydroxyl groups can be isocyanate groups or epoxy groups. Isocyanate groups are preferred. Preferably, if compound (ivb) comprises a functional group, which is a reactive group capable to react with an isocyanate group, and which is not a thiol group (e.g. a hydroxyl or amine group), said compound (ivb) comprises at least one thiol group (e.g. only the first functional group or the first functional group and one or more additional thiol groups).

Preferably, if in compound (ivb) the only group capable to react with an isocyanate group is a thiol group, said compound (ivb) comprises at least two thiol groups (the first functional group and one or more additional thiol groups)

In an embodiment, compound (ivb) comprises at least two thiol groups.

In an embodiment, compound (ivb) comprises at least two thiol groups and no other reactive groups capable to react with an isocyanate group or comprises one or more thiol groups as well as one or more groups (preferably one), other than thiol groups, capable to react with an isocyanate group. The water-dispersible poly(meth)acrylate (K) can be obtained (or is obtainable) by polymerizing by mass or via a solution polymerization method, conventional monomers capable of free radical polymerization and having C=C double bonds (e.g. (meth)acrylic acid or (meth)acrylates monomers), a part of these monomers carrying hydrophilic groups, e.g. carboxyl groups, and part of the monomers comprising reactive groups that are capable to react with hydroxyl or thiol groups (e.g. isocyanate groups or epoxy groups).

In another embodiment of the first aspect, the thiol-functional compound (B) contained in the second dispersion may be an admixture of:

(i) at least one polyurethane polymer (J1) which carries groups which impart water dispersibility to the polyurethane and/or at least one polymer (J2) which carries groups which impart water dispersibility to the polymer, and which is prepared from monomers (e.g. (meth)acrylic acid or (meth) acrylates monomers) capable of free radical polymerization and having C=C double bonds by the method of free radical mass or solution polymerization, the polyurethane polymer (J1) and polymer (J2) comprising less than 0.05 meq of thiol groups per gram, preferably comprising no thiol groups; and (ii) at least one thiol-functional compound (B3) comprising at least two thiol groups, said compound (B3) having a solubility of at most 1 g/l in water and a molecular weight of less than 10000.

The polymer J2 can be for instance a poly(meth)acrylate carrying groups which impart water dispersibility to the polymer.

The amount of thiol-functional compounds (B3) is generally from 1 to 50% by weight of the polyurethane polymer (J1) or polymer (J2), preferably of from 5 to 40%, most preferably of 10-30%.

Thiol-functional compounds (B3) preferably are added before the dispersion of polyurethane polymer (J1) or the polymer (J2). The dispersion may be prepared in a way similar to the way described above for the first dispersion.

Thiol-functional compounds (B3) can be chosen from any of the definition given above for compound (ivb).

Suitable thiol-functional compounds (B3) may be obtained (or obtainable) from the reaction of: (i) a polyol and (ii) a thiocarboxylic acid of the formula HS—$(C_nH_{2n})$—$CO_2H$, wherein n is 1, 2, 3, 4, 5, 6, 7, 8, 9, or 10, and wherein the —SH moiety can alternatively be located on an internal carbon, as opposed to the terminal carbon atom. Additionally, one or more hydroxyl groups can optionally be attached to carbon atoms in the chain. Suitable polyols and thiocarboxylic acids may be chosen from those listed above as being suitable for the preparation of polythiol compounds (ivb).

Non-limiting examples of thiol-functional compounds (B3) which are suitable for use in the present invention include, but are not limited to: glycol dimercaptoacetate, glycol dimercaptopropionate, pentaerythritol tetra-(3-mercaptopropionate), pentaerythritol tri-(3-mercaptopropionate), pentaerythritol tetrathioglycolate, polyethylene glycol dimercaptoacetate, trimethylolpropane tri-(3-mercaptopropionate), and trimethylolpropane trithioglycolate. Most preferred is pentaerythritol tetra(3-mercaptopropionate).

The polyurethane polymer (J1) can be obtained (or obtainable) from the reaction of:
at least one polyisocyanate compound (ib),
at least one polyol (iib), and
at least one hydrophilic compound (iiib) containing at least one reactive group capable to react with isocyanate groups, said hydrophilic compound (iiib) being capable to render the polyurethane polymer (J1) dispersible in aqueous medium either directly or after the reaction with a neutralizing agent to provide a salt.

Suitable compounds (ib), (iib) and (iiib) may be those as defined above for compounds (ia), (iia) and (iiia) respectfully.

In yet another embodiment of the first aspect, the second dispersion may comprise (i) at least one thiol-functional compound (B) selected from a thiol-functional (poly)urethane pre-polymer (B1) and/or from a pre-polymer (B2) as described above, as well as (ii) at least one admixture of at least one polyurethane polymer (J1) and/or a polymer (J2) as described above and of at least one thiol-functional compound (B3) as described above.

In an embodiment of the first aspect, the aqueous dispersion of any of the above embodiments may further comprise a photoinitiator.

In an embodiment of the first aspect, the photoinitiator may be suitable for initiating polymerization upon irradiation with a UV-light source as defined The photoinitiator can be substantially any photoinitiator. A variety of photoinitiators can be utilized in the radiation-curable aqueous dispersions of the present invention. The usual photoinitiators are the type that generates free radicals when exposed to radiation energy. Suitable photoinitiators include, for example, aromatic ketone compounds, such as benzo-phenones, alkylbenzophenones, Michler's ketone, anthrone and halogenated benzophenones. Further suitable compounds include, for example, 2,4,6-trimethylbenzoyldiphenylphosphine oxide, phenylglyoxylic acid esters, anthraquinone and the derivatives thereof, benzil ketals and hydroxyalkylphenones. Illustrative of additional suitable photoinitiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthra-quinone; p-diacetyl-benzene; 9,10-dibromoanthracene; 9,10-dichloro-anthracene; 4,4-dichlorobenzophenone; thioxanthone; isopropyl-thioxanthone; methylthioxanthone; α,α,α-trichloro-para-t-butyl aceto-phenone; 4-methoxybenzophenone; 3-chloro-8-nonylxanthone; 3-iodo-7-methoxyxanthone; carbazole; 4-chloro-4'-benzyl-benzophenone; fluoroene; fluoroenone; 1,4-naphthylphenylketone; 1,3-pentanedione; 2,2-di-sec-butoxy acetophenone; dimethoxyphenyl acetophenone; propiophenone; isopropylthioxanthone; chlorothioxanthone; xanthone; maleimides and their derivatives; and mixtures thereof. There are several suitable photoinitiators commercially available from Ciba including Irgacure 184 (1-hydroxy-cyclohexyl-phenyl-ketone), Irgacure 819 (bis(2,4,6-trimethyl-benzoyl)-phenylphosphineoxide), Irgacure 1850 (a 50/50 mixture of bis(2,6-dimethoxybenzoyl)-2,4,4-trimethylpentyl-phosphine oxide and 1-hydroxy-cyclohexyl-phenyl-ketone), Irgacure 1700 (a 25/75 mixture of bis(2,6-dimethoxybenzoyl)-2,4,4-trimethylpentyl-phosphine oxide and 2-hydroxy-2-methyl-1-phenyl-propan-1-one), Irgacure 907 (2-methyl-1 [4-(methylthio)phenyl]-2-morpholonopropan-1-one), Darocur MBF (a phenyl glyoxylic acid methyl ester) and Darocur 4265 (a 50/50 mixture of bis(2,4,6-trimethylbenzoyl)-phenylphosphineoxide and 2-hydroxy-2-methyl-1-phenyl-propan-1-one). The foregoing lists are meant to be illustrative only and are not meant to exclude any suitable photoinitiators.

Those skilled in the art will know the concentrations at which photo-initiators are effectively employed and generally the concentration will not exceed about 10% by weight of the solid content in the aqueous dispersion of the invention.

In particular, the photoinitiator is preferably suitable for initiating polymerization upon irradiation by a UV-LED or a UV-A lamp.

Exemplary classes of free radical photoinitiators that may be employed include but not limit to phenyl bis(2,4,6-trimethyl benzoyl)phosphine oxide, Irgacure 819DW, Lucerine TPO-L, Esacure KTO-46 (a mixture of phosphine oxide, Esacure KIP 150 and Esacure TZT), 2,4,6-trimethylbenzoyldiphenyl phosphine oxide, isopropylthioxanthone, I-chloro-4-propoxy-thioxanthone, 2,4-diethylthioxanthone, 2-chlorothioxanthone, camphorquinone, and 2-ethyl anthranquinone such as disclosed in WO 2010/126618.

In an embodiment of the first aspect, the aqueous dispersion of any of the above embodiments may further comprise other water-emulsifiable or water-dispersible resins, such as polymer resins, polyurethanes, polyester resins, epoxy resins or alkyd resins, and commercial additives, such as blowing agents, antifoams, emulsifiers, thickeners and thixotropic agents, stabilizers and colorants, such as dyes and pigments.

In an embodiment of the first aspect, the first dispersion and the second dispersion are both neutral. In a preferred embodiment however, the first dispersion may repulse electrostaticaly the second dispersion.

For instance, said first dispersion may comprise dispersed particles having a global positive or negative charge and said second dispersion may comprise dispersed particles having a global charge with the same sign as said dispersed particles of said first dispersion.

It is generally recommended that the first dispersion is substantially free from compounds (B). By substantially free is meant that the first dispersion contains at most 0.5%, preferably at most 0.1%, more preferably at most 0.01% by weight of compounds (B), relative to the total weight of solid contained in said first dispersion. Most preferably said first dispersion does not comprise any compounds (B) that comprise thiol groups.

It is generally recommended that the second dispersion is substantially free from ethylenically unsaturated compounds like the (meth)acrylated pre-polymers (A) and the optional ethylenically unsaturated compounds (C). By substantially free is meant that the second dispersion contains at most 1%, preferably at most 0.5%, more preferably at most 0.05% by weight of ethylenically unsaturated compounds, relative to the total weight of solid contained in said second aqueous dispersion. Most preferably said second dispersion does not comprise any ethylenically unsaturated compounds like the (meth)acrylated pre-polymers (A) and the optional ethylenically unsaturated compounds (C).

Coatings obtained from the aqueous dispersions according to the invention result in selective mechanical properties (harder and softer) and polymer polarity (more hydrophilic or hydrophobic) that allow to cover many different application areas as, for example, coatings for wood, plastic, glass, metal and concrete. The aqueous dispersions according to the invention are also suitable for making adhesives, inks and overprint varnishes.

The present invention therefore also relates to the use of the aqueous dispersions of the invention for making adhesives, inks, varnishes or coatings and to a process for making adhesives, inks, varnishes or coatings wherein a dispersion of the invention according to any of the embodiments as described here above is used. The present invention also relates to process for preparing a coated article comprising a step wherein the article is coated, entirely or in part, with an aqueous dispersion, more in particular a radiation curable aqueous dispersion according to the invention.

The aqueous dispersions according to the invention are particularly suitable for making coatings for example for wood furniture and plastic resilient flooring. The aqueous dispersions according to the invention are also particularly suitable for coating plastic articles, especially 3-dimensional objects made from polyethylene, polypropylene, polycarbonate, optionally precoated with other coatings such as polyurethanes.

In a second aspect, the present invention relates to a coating composition, ink, varnish or adhesive prepared from an aqueous dispersion according to any embodiment of the first aspect. In particular there are provided coating compositions, inks, varnishes and adhesives comprising an aqueous dispersion according to any embodiment of the first aspect.

In a third aspect, the present invention relates to a coating obtainable by:
a. applying an aqueous dispersion according to any embodiment of the first aspect on at least one surface of a substrate,
b. evaporating the water present in said dispersion, and
c. irradiating said coated substrate with a UV-light source.

The UV-light sources typically emit at wavelengths between 200 and 800 nm, yet an advantage of the present invention is that curing with UV-A lamps and/or with UV LED light sources is possible, which typically emit in a spectrum with the strongest wavelengths in the range of from 350 to 450 nm.

In particular, the UV-light source may only emit in the UV-A and/or UV-visible part of the UV spectrum and therefore not in the UV-B or UV-C part of the UV spectrum. More in particular, the light UV-light source may be emitting mostly, essentially or only at wavelengths higher than 300 nm. Preferably, the UV-light source emits mostly, essentially or only at wavelengths higher than 320 nm, more preferably higher than 330 nm, more preferably higher than 350 nm, even more preferably at least 360 nm.

In an embodiment, the light source may emit at least at a wavelength lower than 450 nm and preferably mostly or essentially at a wavelength lower than 450 nm, preferably lower than 420 nm.

In an embodiment, the light source may essentially emit in an optical window with the strongest wavelengths in the range of from 320 to 450 nm, typically from 330 to 440, preferably from 350 to 430, more preferably 360 to 420.

The aqueous dispersions of the invention are curable using radiation sources having wavelengths of at least 300 nm and preferably from about 320, more preferably from about 350 to about 450 nm. The radiation can be provided by any suitable source such as UV lamps having reduced infrared emission or UV lamps fitted with filters to eliminate infrared emissions or so-called LEDs (light-emitting devices) emitting radiation in the wavelength noted. Particularly useful commercially available devices include: the Panacol UV H-254 lamp (available from Panacol-Elosol GmbH)—a 250 W ozone-free, iron doped metal halide lamp with spectral wavelength of from 320 to 450 nm; Panacol UVF-450 (320 nm to 450 nm depending on the black, blue or clear filter used); Honle UVA HAND 250 CUL (available from Honle UV America Inc)—emitting maximum intensity UVA range of −320 to 390 nm; PMP 250 watt metal halide lamp (available from Pro Motor Car Products Inc); Cure-Tek UVA-400 (available from H&S Autoshot) which has a 400-watt metal halide bulb and the lamp assembly can be fitted with different filters like blue, light blue or clear to control/eliminate the infra-red radiation from the lamp source); Cure-Tek UVA-1200 (available from H&S Autoshot) which has a 1200-watt metal halide bulb and the lamp assembly can be fitted with different filters like blue, light blue or clear to control/eliminate the infra-red radiation from the lamp source); Con-Trol-Cure Scarab-250 UV-A shop lamp system (available from UV Process Supply Inc.—has a 250 W iron doped metal halide lamp with a spectral wavelength output of 320 to 450 nm); Con-Trol-Cure—UV LED Cure-All 415 (available from UV Process Supply Inc.—spectral wavelength of 415 nm with a 2.5 to 7.95 W operating wattage range), the Con-Trol-Cure—UV LED Cure-All 390 (available from UV Process Supply Inc.—spectral wavelength of 390 nm with a 2.76 to 9.28 W operating wattage range) and the UV H253 UV lamp (available from UV Light Technologies—the unit contained a 250 W iron doped metal halide lamp fitted with a black glass filter to produce a spectral wavelength of between 300 and 400 nm). Other suitable lamp systems include the Phoseon product range: RX FireJet; RX FirePower; RX FireLine; RX FireEdge; RX FireFly; RX StarFire; RX StarFir MAX; RX FireFlex.

Substrates or articles that can be coated or treated according to embodiments of the present invention can for instance comprise wood, paper, metal, glass, ceramic, concrete, fiberglass, plastic, vinyl, leather or another coating layer.

Application techniques include for instance spraying, rolling, knife-coating, pouring, brushing or dipping amongst others Applications includes for instance floor coating, metal coating, refinish coating, concrete coating, architectural coating, curing of 3D objects in semi-industrial environment which prohibit the use of harmful UV-B and UV-C light; automotive applications in a car body shop; applications were safety concerns are associated with the use of UV lamps; repairs needed to be performed rapidly and at ambient temperature but also any kind of coating application outside an industrial environment (also called field applied application).

In a fourth aspect, the present invention relates to an article coated or treated, either entirely or in part, with a coating, ink, varnish or adhesive according to the second aspect or with a coating according to the third aspect.

In a fifth aspect, the present invention relates to a process for preparing a coated article comprising a step wherein at least one surface of the article is coated or treated with an aqueous dispersion according to any embodiment of the first aspect of the present invention.

In an embodiment of the fifth aspect, the process may further comprise a step of removing (e.g. evaporating) the water present in said dispersion.

In an embodiment of the fifth aspect, the process may further comprise a step of irradiating said coated article with a UV-light source emitting at a wavelength from 200 nm to 800 nm. Preferably, the UV-light source emits only at wavelengths higher than 300 nm, more preferably at least 320 nm and at least at a wavelength at most 450 nm. Preferably, the UV-light source emits as defined in the second aspect of the present invention. The irradiation step is preferably performed after the evaporation of the water present in said dispersion.

In an embodiment of the fifth aspect, the UV-light source is preferably a UV-A or UV-LED light source. Preferably, the UV-light source is a UV-LED light source.

In an embodiment of the fifth aspect, the process may be performed in presence of oxygen. This is advantageous as it does not require working under an inert atmosphere such as a nitrogen atmosphere. Such an inert atmosphere is complicate and expensive to maintain In a sixth aspect, the present invention relates to the use of a UV-light source emitting only at wavelengths higher than 300 nm and at least at a wavelength lower than 420 nm in a method for forming a coating from a aqueous dispersion according to any embodiment of the first aspect. UV-light source is preferably emitting as defined in the second aspect of the present invention.

In a seventh aspect, the present invention relates to a process for the preparation of an aqueous dispersion according to any embodiment of the first aspect comprising:
the preparation of said first dispersion,
the preparation of said second dispersion, and
the mixing of said first dispersion with said second dispersion. The mixing of the two dispersions can for instance be carried out by stirring one dispersion into the other. The dispersions preferably have a charge of the same sign. The mixing can then also be done by direct dispersion of the (meth)acrylated pre-polymers (A) and, optionally, the ethylenically unsaturated compound (C) in the thiol-functional aqueous second dispersion or vice versa.

The aqueous dispersions of the invention generally are characterized by one or more, preferably all of the following properties: a total solids content of from about 10 to 80 wt %, preferably from about 20 to 60 wt % and more preferably from about 30 to 50 wt %, most preferably from about 35 to 40 wt %; a viscosity measured at 25° C. of 20 to 5000 mPa s, preferably 25 to 1000 mPa s, more preferably 25 to 200 mPa s, a pH value of 7 to 11, preferably of 7 to 8.5, an average particle size of about 10 to 1000 nm, preferably 50 to 200 nm, more preferably 50 to 150 nm; a film formation temperature that ranges from 0 to 20° C., more preferably from 0 to 5° C.

The above and other characteristics, features and advantages of the present invention will become apparent from the following detailed description.

This description is given for the sake of example only, without limiting the scope of the invention.

DESCRIPTION OF ILLUSTRATIVE EMBODIMENTS

The present invention will be described with respect to particular embodiments but the invention is not limited thereto.

Example 1: Preparation of a Dispersion Comprising an Acrylated Polyurethane Pre-Polymer A1

A double-wall glass reactor equipped with a mechanical stirrer, a thermocouple, a vapor condenser and a dropping funnel was charged with 37.8 g of a polyester polyol having an average molecular weight of 670, an hydroxyl number of 167 mg KOH/g and obtained from the polycondensation of neopentylglycol and a mixture of adipic acid and isophtalic acid in a 1:1 weight ratio, 91 g of the acrylic acid adduct of bisphenol A diglycidyl ether (BPAAA), 28.6 g of dimethylol propionic acid (DMPA), 192.7 g of 1,1'-methylene bis(4-isocyanato cyclohexane) (H12MDI), 223 g of acetone, 3.3 g of TINUVIN®622 and 0.5 g of dibutyltinlaurate as a 10% wt solution in acetone. The reaction mixture was heated until 600 C under stirring and kept under reflux until the isocyanate content reached a value of 1.09 meg/g. Then 0.4 g of 4-methoxyphenol dissolved in a 319 g of a reaction mixture of dipentaerythrytol tetraacrylate, dipentaerythrytol pentaacrylate and dipentaerythrytol hexaacrylate (DPHA), having an hydroxyl number of 67 mg KOH/g was added slowly to the reactor and the reaction mixture was kept under reflux until the isocyanate content reached a value of 0.19 meq/g. The mixture was then cooled down to 45° C. and 21.5 g of triethylamine was added under stirring. The resulting mixture was then added slowly to 1802 g of water at room temperature under high shear agitation until a stable dispersion was obtained. The acetone was stripped off under vacuum at a temperature of 50° C. until its level as measured by gas chromatography was below 0.15 wt %. The polymer dispersion was then cooled down below 30° C. and 2.8 g of a biocide (Acticide® MBS) was added. The dispersion was filtered over a 100µ sieve and its solid content was adjusted to 35% wt by adding water. The dry content was measured by gravimetric method. The viscosity of the dispersion was 25 mPa·s (measured at 25° C. with a Brookfield RTV viscometer using spindle N° 1 at 50 rpm). The product showed a good colloidal stability after 10 days storage at 60° C.

The acrylate density of the product was 5.1 meq/g measured by following the method: the nuclear magnetic resonance spectroscopy method described above.

Example 2: Preparation of a Dispersion Comprising an Acrylated Polyurethane Pre-Polymer A2

A double-wall glass reactor equipped with a mechanical stirrer, a thermocouple, a vapor condenser and a dropping funnel was charged with 170.42 g of a polyester polyol having an average molecular weight about 670 Dalton, an hydroxyl number of 167 mg KOH/g and obtained from the polycondensation of adipic acid and neopentylglycol, 47.72 g of dimethylol propionic acid, 21.98 g of cyclohexane dimethanol, 319.88 g of 1,1'-methylene bis(4-isocyanato cyclohexane) (H12MDI), 240 g of acetone and 0.8 g of dibutyltinlaurate as a 10% wt solution in acetone. The reaction mixture was heated to reflux with stirring and kept under reflux until the isocyanate content reached a value of 1.47 meq/g. Then 0.51 g of 4-methoxyphenol dissolved in 220.75 g of DTMPTA, a product comprising a mixture of ditrimethylolpropane triacrylate and ditrimethylolpropane tetraacrylate and having a hydroxyl number of 137 mg KOH/g was added slowly to the reactor and the reaction mixture was kept under reflux until the isocyanate content reached a value of 0.19 meq/g. The polyurethane pre-polymer was cooled down to 45° C. and 36.3 g of triethylamine was added under stirring. The resulting mixture was then added slowly to 1470 g of water at room temperature under high shear agitation until a stable dispersion was obtained. The acetone was stripped off under vacuum at a temperature of 50° C. until it's level as measured by gas chromatography was below 0.15 wt %. The polymer dispersion was then cooled down below 30° C. and 2.26 g of a biocide (Acticide® MBS) was added. The dispersion was filtered over a 100µ sieve and its solid content was adjusted to 35% wt by adding water. The dry content was measured by gravimetric method. The viscosity of the dispersion was 35 mPa·s (measured at 25° C. with a Brookfield RTV viscometer using spindle N° 1 at 50 rpm). The product showed a good colloidal stability after 10 days storage at 60° C.

The acrylate density of the product was 2.3 meq/g on solids measured by following the nuclear magnetic resonance spectroscopy method described above.

Example 3: Preparation of a Dispersion Comprising a Thiol-Functional Polyurethane B A double-wall glass reactor equipped with a mechanical stirrer, a thermocouple, a vapor condenser and a dropping funnel was charged with 88.6 g of a polyester polyol having an average molecular weight of about 670 Dalton (obtained by the polycondensation of adipic acid and neopentylglycol), 18.08 g of dimethylol propionic acid, 15.81 g of cyclohexane dimethanol, 177.47 g of 1,1'-methylene bis(4-isocyanato cyclohexane) (H12MDI), 100 g of acetone and 0.4 g of dibutyltinlaurate solution in acetone (at 10 wt %) as a reaction catalyst. The reaction mixture was heated to reflux with stirring, and the condensation process was maintained until the isocyanate content reached 1.47 meq/g. Thereafter the mixture was diluted further with 232 g of acetone. The polyurethane pre-polymer was cooled down to 55° C. 199.3 g of trimethylolpropane trimercaptopropionate (tmpmp) and 0.83 g of triethylamine was added to the vessel. The reaction mixture was kept at 55° C. until disappearance of isocyanate band at 2273 cm-1 in IR spectrum. Then, 12.8 g of triethylamine was added as neutralizing agent in the warm pre-polymer until an homogenous mixture was obtained. 920 g of water at room temperature was then loaded in the reactor under vigorous mixing and beyond the phase inversion point. A stable polymer dispersion was obtained after about 5 minutes of vigorous mixing, but the agitation was maintained over a period of 1 hour. The dispersion was filtered over a 100μ sieve. The solid content measured by gravimetric method was 35.8% wt. The viscosity of the dispersion was 362 mPa·s (measured at 25° C. with a Brookfield RTV viscometer using spindle N° 1 at 50 rpm). The product showed a good colloidal stability after 10 days of storage at 60° C.

Theoretical SH content: 2.13 meq/g* on solids.

The theoretical amount of SH groups (theoretical SH content) was calculated on total equivalents SH functions present in TMPMP minus SH functions reacted with isocyanates remaining after the first step. The details of the calculation are as follow:

meq NCO after first step=1.47 meq/g*total mass (=400.36 g)=588 meq
meq SH groups=199.31 g TMPMP/356.5 (MW TMPMP)*3 (functionality)*1000=1677 meq
Total meq SH remaining=1677−588=1089 meq
Total mass solids: 512.1 g
Total mass dispersion: 1432.1 g
Total SH content on solids (meq/g)=1089 meq SH/512.1 g=2.13 meq/g SH
Total SH content on dispersion (meq/g)=1089 meq SH/1432.1 g=0.76 meq/g SH

Example 4: Preparation of an Aqueous Dispersion Comprising a Mixture of 90 Parts of the Dispersion Obtained in Example 1 and 10 Parts of the Dispersion Obtained in Example 3

10 parts of the dispersion obtained in example 3 were added to 90 parts of the dispersion obtained in example 1. The composition was then formulated with 2% wt of a photo-initiator (Lucerine TPO-L) and the viscosity was adjusted to about 1500 mPa·s (Brookfield) using a thickener Ucecoat 8460:water (1:1).

Ratio SH/acrylates (mol/mol)=0.047=(2.13 meq/g*35.8%/5.1 meq/g*35%)*10/90=0.047

Example 5: Preparation of an Aqueous Dispersion Comprising a Mixture of 70 Parts of the Dispersion Obtained in Example 1 and 30 Parts of the Dispersion Obtained in Example 3

The same procedure as in example 4 was followed but 30 parts of the dispersion obtained in example 3 were added to 70 parts of the dispersion obtained in example 1.

Ratio SH/acrylates (mol/mol)=0.18=(2.13 meq/g*35.8%/5.1 meq/g*35%)*30/70=0.18

Example 6: Preparation of an Aqueous Dispersion Comprising a Mixture of 50 Parts of the Dispersion Obtained in Example 1 and 50 Parts of the Dispersion Obtained in Example 3

The same procedure as in example 4 was followed but 50 parts of the dispersion obtained in example 3 were added to 50 parts of the dispersion obtained in example 1.

Ratio SH/acrylates (mol/mol)=0.43=(2.13 meq/g*35.8%/5.1 meq/g*35%)*50/50=0.43

Example 7: Preparation of an Aqueous Dispersion Comprising a Mixture of 70 Parts of the Dispersion Obtained in Example 2 and 30 Parts of the Dispersion Obtained in Example 3

The same procedure as in example 5 was followed but the dispersion obtained in example 1 was replaced by the dispersion obtained in example 2.

Ratio SH/acrylates (mol/mol)=0.41=(2.13 meq/g*35.8%/2.3 meq/g*35%)*30/70=0.41

Example 8: Test Methods and Results

Examples 1, 2 and 3 to 7 were evaluated on colloidal stability, surface cure reactivity, acetone double rubs and yellowing upon cure.

Example 8.1: Evaluation of the Dispersions Colloidal Stability

The colloidal stability was assessed by observing the decantation, phase separation and/or gelling on a 200 g sample placed in an oven at 60° C. The sample is approved (+) if no important changes are noticed (table 1).

|  | Example n° | | | | | | |
| --- | --- | --- | --- | --- | --- | --- | --- |
|  | 1 | 2 | 3 | 4 | 5 | 6 | 7 |
| A1 | 100 |  |  | 90 | 70 | 50 |  |
| A2 |  | 100 |  |  |  |  | 70 |
| B |  |  | 100 | 10 | 30 | 50 | 30 |
| Colloidal stability |  |  |  |  |  |  |  |
| 1 day | + | + | + | + | + | + | + |
| 3 day | + | + | + | + | + | + | + |
| 10 day | + | + | + | + | + | −(gel) | + |

Table 1 shows the colloidal stability of the various prepared dispersions. Mixtures of PU dispersions of example 1 or 2 with thiol-functional polyurethane dispersions (PUD) of example 3 are stable at least down to a 70/30 mixture. At 50/50, gelling occurred after 10 days storage at 60° C.

Example 8.2: Reactivity of Cured Film Under UV-LED and UV-A Lamps

The different dispersions were applied onto a non-porous substrate (white paper, Silico Ultraflat) and the water was allowed to evaporate by exposing the film for 1 min to a temperature of 120° C. After the water had evaporated, the coating was exposed to visible light or UV-A light in order to crosslink the polymer. Curing was done with respectively a Phoseon Fireline 225, Phoseon RX10 and a Panacol 254 UV-A lamp. The Phoseon Fireline 225 has a specified wavelength of 380-420 nm employing 8 W/cm$^2$ water cooled UV LEDs. The Phoseon Fireline 225 is mounted on a conveyor belt (Jenton International Limited). The height of the LEDs from the coating surface is adjusted to 2 cm. The Phoseon RX10 lamp has also specified wavelength of 380-420 nm and is employing 2 W/cm$^2$ air cooled UV LEDs. The Panacol 254 250 W UV-A lamp is combined with a blue filter glass to restrict wavelength transmission range to 320-450 nm. The height of Panacol UV-A lamp from the coating surface is 15 cm.

Surface cure reactivity covers the minimum UV dose cure expressed in m/min (Phoseon Fireline 225) or mJ/cm$^2$ (UV-A lamp—Phoseon RX10 lamp) needed to cure the coating to an extent that no visual mark remains when scratching the coating with a fingernail (see table 2).

Acetone double rubs (ADR which is a measure for the through cure): Rubs are made with a piece of cotton rag saturated with acetone; one double rub is equal to a forward and backward stroke on the coated surface. The reported number is the number of double rubs required to break through the coating (see table 2).

| | Reactivity (Surface cure) | | | ADR at surface cure reactivity | | |
|---|---|---|---|---|---|---|
| | Phoseon Fireline 225 (m/min) | Phoseon RX10 (UV LED lamp) (mJ/cm2) | Panacol 254 (UV-A lamp) (mJ/cm2) | Phoseon Fireline 225 (m/min) | Phoseon RX10 (UV LED lamp) | Panacol 254 (UV-A lamp) |
| Example 1 | 5 | 1365 | 2280 | >100 | >100 | >100 |
| Example 3 | <5* | Not cured* | — | — | — | — |
| Example 4 | 10 | 500 | 1140 | >100 | >100 | >100 |
| Example 5 | 20 | 275 | 760 | >100 | >100 | >100 |
| Example 6 | 20 | 275 | — | 30 | 60 | >100 |
| Example 7 | <5* | 20976 | — | — | — | — |

*Surface cure properties were not ok at 5 m/min (Phoseon Fireline 225) and for Phoseon RX10.

The energy density (mJ/cm$^2$) was measured using an EIT UV PowerMap radiometer. The energy density is the sum of the energy density measured for UV-C, UV-B, UV-A and UV-V.

Table 2 shows that an improvement in coating reactivity (surface cure) is obtained when adding a thiol-functional dispersion to the polyurethane dispersion from example 1. The solvent resistance tested by acetone double rubs remains good, except for example 5 where a 50/50 ratio UV-PUD (ex 1) and thiol functional dispersion (ex 3) was used.

Example 8.3: Yellowing

The yellowing of the coating was measured on a 40μ wet coating applied to a non-porous substrate (white paper, Silico Ultraflat). The photo-yellowing of the samples was then evaluated by measuring, after various periods, the b-values of the L*a*b system LAB values (measured with a Braive Supercolor Instrument). The Δb value represents the value measured on the coated substrate subtracted with the value measured on the uncoated Silico Ultraflat white paper. The Δb-values are summarized in table 3.

TABLE 3 yellowing of UV coating cured with Phoseon Fireline 225. The samples are cured at their surface cure reactivity. Yellowing (Δb-value) is expressed as the b-value measured on the coated substrate minus the value of the uncoated substrate.

| | Yellowing (Δb-value) | |
|---|---|---|
| | 1 hr | 1 day |
| Example 1 | 3.11 | 1.39 |
| Example 4 | 2.58 | 1.27 |
| Example 5 | 2.3 | 1.18 |
| Example 6 | 2.31 | 1.15 |

Table 3: Δb-values of coated substrates 1 hr and 1 day after the coating has been cured.

Conclusion: Addition of the thiol-dispersion does not have a negative influence on the yellowing of the coating after UV exposure. On the contrary a gradual decrease in Δb-value was observed upon increasing the concentration of the thiol-functional dispersion.

It is to be understood that although preferred embodiments, specific constructions and configurations, as well as materials, have been discussed herein for devices according to the present invention, various changes or modifications in form and detail may be made without departing from the scope of this invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A stable radiation curable aqueous dispersion comprising a mixture of a first dispersion and a second dispersion, and a photoinitiator,
   wherein said first dispersion comprises at least one (meth) acrylated pre-polymer (A) and, optionally, at least one ethylenically unsaturated compound (C), and
   said second dispersion comprises at least one thiol-functional compound (B) and is different from said first dispersion,
   wherein an equivalent ratio between (i) a concentration of thiol groups and (ii) a concentration of meth(acrylate) groups and, if present, of ethylenically unsaturated groups is 0.30 or less, wherein said concentrations are expressed in milli-equivalents per gram of solid contained in said aqueous dispersion,
   wherein said first dispersion comprises dispersed particles having a global positive or negative charge and said second dispersion comprises dispersed particles having a global charge with the same sign as said dispersed particles of said first dispersion,
   wherein the dispersed particles of the first dispersion are different from the dispersed particles of the second dispersion,
   wherein the at least one ethylenically unsaturated compound (C) is at least one (poly)(meth)acryloyl-containing compound, wherein said (meth)acrylated pre-polymer (A) is selected from (meth)acrylated (poly)urethane pre-polymers (A) obtained from the reaction of:
- at least one polyisocyanate compound (ia),
- optionally, at least one polyol (iia),
- at least one hydrophilic compound (iiia) containing at least one reactive group capable of reacting with isocyanate groups, said hydrophilic compound (iiia) being capable of rendering the (poly)urethane pre-polymer dispersible in aqueous medium either directly or after a reaction with a neutralizing agent to provide a salt,
- at least one (meth)acrylated compound (iva) containing at least two reactive groups capable of reacting with isocyanate groups, and
- at least one (meth)acrylated compound (va) containing one reactive group capable of reacting with isocyanate groups, and wherein said at least one thiol-functional compound (B) comprises at least one thiol-functional (poly)urethane pre-polymer (B1) which carries groups which impart water dispersibility to the (poly)urethane and/or at least one thiol-functional pre-polymer (B2) which carries groups which impart water dispersibility to the pre-polymer (B2), and which is prepared from monomers capable of free radical polymerization and having C=C double bonds by the method of free radical mass or solution polymerization,
- the thiol-functional (poly)urethane pre-polymer (B1) and the thiol-functional pre-polymer (B2) carrying from 0.05 to 5 meq of thiol groups per gram of thiol-functional (poly)urethane pre-polymer (B1) or thiol-functional pre-polymer (B2) respectively.

2. The stable aqueous dispersion according to claim 1, wherein a total amount of (meth)acrylated groups in the pre-polymer (A) is at least 3.0 meq of (meth)acrylated groups per total weight in grams of compounds (ia), (iia), (iiia), (va) and (iva).

3. The stable aqueous dispersion according to claim 2, wherein the total amount of (meth)acrylated groups in the pre-polymer (A) is at least 3.5 meq of (meth)acrylated groups per total weight in grams of compounds (ia), (iia), (iiia), (va) and (iva).

4. The stable aqueous dispersion according to claim 1, wherein the (poly)urethane pre-polymer (B1) is obtained from the reaction of:
- at least one polyisocyanate compound (ib),
- at least one polyol (iib),
- at least one hydrophilic compound (iiib) containing at least one reactive group capable of reacting with isocyanate groups, said hydrophilic compound (iiib) being capable of rendering the (poly)urethane pre-polymer (B1) dispersible in aqueous medium either directly or after a reaction with a neutralizing agent to provide a salt, and
- at least one compound (ivb) containing at least two functional groups of which a first functional group is a thiol group and a second functional group is a reactive group capable of reacting with an isocyanate group.

5. The stable aqueous dispersion according to claim 1, wherein said second dispersion comprises an admixture of:
(i) at least one polyurethane polymer (J1) which carries groups which impart water dispersibility to the polyurethane (J1) and/or at least one polymer (J2) which carries groups which impart water dispersibility to the polymer (J2), prepared from monomers capable of free radical polymerization and having C=C double bonds by the method of free radical mass or solution polymerization, the polyurethane polymer (J1) and the polymer (J2) comprising less than 0.05 meq of thiol groups per gram; and
(ii) at least one thiol-functional compound (B3) comprising at least two thiol groups, said compound (B3) having a solubility of at most 1 g/l in water and a molecular weight of less than 10000.

6. The stable aqueous dispersion according to claim 1, wherein the thiol-functional compound (B) of the second dispersion is different from the (meth)acrylated pre-polymer (A) of the first dispersion.

7. The stable aqueous dispersion according to claim 1, wherein the equivalent ratio between (i) the concentration of thiol groups and (ii) the concentration of meth(acrylate) groups and, if present, of ethylenically unsaturated groups is 0.18 or less, wherein said concentrations are expressed in milli-equivalents per gram of solid contained in said aqueous dispersion.

8. A coating composition, ink, varnish or adhesive prepared from the stable aqueous dispersion according to claim 1.

9. An article coated or treated, either entirely or in part, with the coating composition, ink, varnish or adhesive according to claim 8.

10. A process for preparing a coated article comprising a step wherein at least one surface of the article is coated or treated with the stable aqueous dispersion according to claim 1.

11. The process according to claim 10, further comprising a step of irradiating said coated article with a UV-light source emitting in a spectrum having the strongest wavelengths between 350 nm and at 450 nm.

12. A process for the preparation of the stable aqueous dispersion according to claim 1 comprising:
preparing said first dispersion,
preparing said second dispersion, and
mixing said first dispersion with said second dispersion.

* * * * *